United States Patent
Glass et al.

[11] Patent Number: 6,013,291
[45] Date of Patent: Jan. 11, 2000

[54] MICROWAVE POPCORN WITH LIQUID FAT AND METHOD OF PREPARATION

[75] Inventors: Brian E. Glass, Maple Grove; Pamela J. Dickerson, Eden Prairie, both of Minn.

[73] Assignee: General Mills, Inc., Minneapolis, Minn.

[21] Appl. No.: 09/210,112

[22] Filed: Dec. 11, 1998

[51] Int. Cl.[7] ............................... A23L 1/18; A23L 1/302
[52] U.S. Cl. .................. 426/74; 426/93; 426/107; 426/113; 426/121; 426/124; 426/126; 426/234; 426/398; 426/401; 426/412; 426/625; 426/627
[58] Field of Search ................. 426/74, 89, 93, 426/107, 113, 121, 124, 126, 234, 625, 627, 398, 401, 412; 219/727; 383/113

[56] References Cited

U.S. PATENT DOCUMENTS

| | | |
|---|---|---|
| 3,851,574 | 12/1974 | Katz et al. . |
| 3,973,045 | 8/1976 | Brandberg et al. . |
| 4,096,281 | 6/1978 | Young et al. . |
| 4,385,076 | 5/1983 | Crosby . |
| 4,450,180 | 5/1984 | Watkins . |
| 4,548,826 | 10/1985 | Watkins . |
| 4,806,371 | 2/1989 | Mendenhall . |
| 4,844,921 | 7/1989 | Bakal et al. . |
| 4,904,487 | 2/1990 | LaBaw et al. . |
| 4,904,488 | 2/1990 | LaBaw et al. . |
| 4,906,490 | 3/1990 | Bakal et al. . |
| 4,960,606 | 10/1990 | Crosby . |
| 5,075,119 | 12/1991 | Mendenhall . |
| 5,190,777 | 3/1993 | Anderson et al. . |
| 5,409,729 | 4/1995 | Friesen . |
| 5,443,858 | 8/1995 | Jensen et al. . |
| 5,463,845 | 11/1995 | Gwiazdon et al. . |
| 5,514,407 | 5/1996 | Perlman et al. . |
| 5,597,596 | 1/1997 | Henderson . |
| 5,624,703 | 4/1997 | Perlman et al. . |
| 5,688,543 | 11/1997 | Freeport et al. . |
| 5,690,853 | 11/1997 | Jackson et al. . |
| 5,695,806 | 12/1997 | Bateman . |
| 5,747,080 | 5/1998 | Lemke et al. ............................ 426/72 |
| 5,750,166 | 5/1998 | Schellhaass . |
| 5,753,287 | 5/1998 | Chedid et al. . |
| 5,879,894 | 4/1999 | Glass ....................................... 426/89 |
| 5,919,505 | 7/1999 | Monsalve et al. ...................... 426/107 |

FOREIGN PATENT DOCUMENTS

WO 95/01105  12/1995  WIPO .

Primary Examiner—Nina Bhat
Attorney, Agent, or Firm—John A. O'Toole; Douglas J. Taylor

[57] ABSTRACT

Disclosed are methods of preparing lowfat and reduced fat popcorn microwave popcorn articles using cold kernel popcorn (60° F.) such as from winter storage. The methods employ low levels (1% to 20%) of an oil ingredient having a melting point of ≦60° F. to minimize the congealing of the oil by and onto the cold kernel popcorn thereby providing a more pliable bag, which does not jam in the filling equipment. The microwave popcorn articles comprise any conventional microwave popcorn bag, and a food charge disposed therein comprising kernel popcorn, 1% to 20% oil, and 0% to 4% salt.

71 Claims, 2 Drawing Sheets

MICROWAVE POPCORN WITH LIQUID FAT AND METHOD OF PREPARATION

FIELD OF THE INVENTION

The present invention relates to packaged food products. More particularly, the present invention relates to microwave popcorn product articles characterized by having only a liquid oil and to methods for filling such articles.

BACKGROUND

Popcorn is a highly popular snack food item. In the past, the at-home preparation of popcorn by the consumer involved adding kernel popcorn plus a cooking oil to a covered pot and heating until the popcorn kernels popped to make popcorn. As used herein, "kernel popcorn" refers to unpopped popcorn. The noun "popcorn" or synonymously "popped popcorn" refers herein to popped kernel popcorn. The adjective "popcorn" can refer to either. Once prepared, common, relatively coarse, table salt is a frequently added flavoring or condiment. The resultant salted popped popcorn is a familiar snack food.

More recently, microwave popcorn products have become extremely popular. At present, in the U.S., over 70 different brands of microwave popcorn products are available. In general, the more popular microwave popcorn products comprise an expandable paper bag containing a charge of kernel popcorn, fat and salt. The microwave popcorn article is adapted to be heated in a microwave oven for three to five minutes to produce the popped popcorn. More recently, improved microwave popcorn articles have been fabricated employing a metallized susceptor which facilitates the heating of the kernel popcorn-fat charge and which, in turn, leads desirably to increases in popcorn volume and decreases in unpopped kernels. Microwave popcorn articles of this type are described in detail in, for example, U.S. Pat. No. 4,450,180 (issued May 22, 1984 to J. D. Watkins and incorporated herein by reference).

Microwave popcorn articles, of course, comprise a microwave popping bag and a charge of kernel popcorn, fat, and, usually, salt. Certain early patents taught the addition of kernel popcorn, fat that is solid at room temperature and salt in the form of a prefabricated toroid or doughnut shaped piece. The piece was fabricated by mixing the kernel popcorn, salt and melted fat to form a blend and the blend was allowed to cool and harden into the toroid shape desired. These circular pieces were then dropped into the desired chamber of the popcorn bag prior to final sealing. (See for example U.S. Pat. No. 4,450,180, issued May 22, 1984).

Contemporary methods of filling microwave popcorn bags, however, employ a different filling process and technique. (See, for example, U.S. Pat. No. 4,604,854 entitled "Machine For Forming, Filling and Sealing Bags," issued Aug. 12, 1986 to D. W. Andreas). The microwave bags having an unsealed open end are advanced to a first kernel popcorn filling station. While being maintained in an open position, the kernel popcorn is charged to the desired channel. Thereafter, the bags are advanced to a second filling station at which the fat/salt slurry is added to the bag. Prior to filling, the fat is heated to well above its melting point to form a liquid oil. Typically, the slurry is added in the form of a vertically dispensed pencil jet (i.e., a confined stream) of the slurry. Single station filling methods are also known that involve applying the fat/salt slurry as a spray onto the kernel popcorn as the kernel popcorn falls into the bag. (See, for example WO 95/01105 entitled "Reduced Fat Microwave Popcorn and Method of Preparation" published Jan. 12, 1995, or, equivalently, U.S. Pat. No. 5,690,979 issued Nov. 25, 1997 which is incorporated herein by reference). Such single station filling techniques are especially useful for the preparation of low fat microwave popcorn products.

The bags now containing both kernel popcorn and slurry are then advanced to a sealing station where the bags are provided with a top seal to complete the closure of the bag. The sealed popcorn bags are advanced to subsequent finish packaging operations which complete the folding of the bags, providing the bags with an overwrap, and inserting appropriate numbers of the bags into cartons, etc.

Current varieties of microwave popcorn products include full fat products (e.g., 20–35% fat), reduced fat (10–20% fat) and low fat products (10%).

Regardless of fat content, conventional microwave popcorn products generally employ a partially hydrogenated vegetable oil (usually soybean oil) which is solid at room temperature. This increases oil stability and provides a solid oil or fat, which is less prone to wicking out of the bag during extended storage. A typical melting point for such an oil would be about 106° F. (41.1° C.)

One processing problem is that during the winter months (when the corn is desirably fresh from harvest), bulk corn may reach temperatures significantly below room temperature (e.g., 30 to 50° F.), due to outside storage and bulk rail or truck transportation. In the manufacture of reduced fat or low fat microwave popcorn products, when the relatively small amount of hot oil slurry is applied to the cold corn (typically about 5 grams of oil slurry to 85 grams of corn), the cold corn causes the slurry to set very rapidly while the bag articles are still in the filling machine. This undesirably results in a bulky, non-pliable bag, which is more prone to jamming during the rest of the filling. The manufacture of higher fat containing popcorn products such as full fat microwave popcorn articles is less prone to these manufacturing problems since there is enough mass of warm, 125° F. oil, that the cold corn can't crystallize enough of the oil quickly enough to cause setting up of the oil.

Of course, one way of overcoming these seasonal manufacturing problems would be to warm the corn prior to filling in the manufacturing of the microwave popcorn articles. However, since the finished articles are returned to storage under uncontrolled winter temperatures, such heating is neither economical nor energy efficient. Another solution is to defer manufacture after corn harvest until the following warm season and to complete the manufacture of an entire year's consumption of microwave popcorn within the warm season. Particularly in the upper midwest of the United States having long winter seasons, this solution is neither practical nor economical. Still another technique is to heat the hydrogenated fat to much higher oil temperatures. However, providing an oil supply maintained at such higher temperatures can adversely degrade desirable butter flavors or butter derived constituents added to the oil.

Surprisingly, the seasonal manufacturing problems can be overcome in the manufacture of lowfat and reduced fat microwave popcorn articles.

A surprising, simple, novel solution to this problem to use a liquid oil in place of the typical solid fat.

Such a liquid oil may have a melting point of about 60° F. or less. Since the oil is a liquid, even at room temperature, coming into contact with the cold corn during filling just decreases the oil temperature, without causing a phase change in the oil. Without any setting of the oil, the end result is a much more pliable bag, which does not jam in the filling equipment.

Another advantage of employing liquid oil is that such oil is lower in undesirable saturated fat and trans fatty acids.

In view of the prior art and the problems described above, there is a continuing need for new and useful microwave popcorn products that are reduced or low in fat that nonetheless can be easily manufactured even during cold months. Accordingly, it is an object of the present invention to provide microwave popcorn products reduced fat levels that are formulated to facilitate manufacture even when using cold corn.

In particular, it is an object of the present invention to provide methods for preparing reduced and low fat microwave popcorn products having at least a major portion of the fat component supplied by an oil that is liquid at room temperature and below.

In view of these processing difficulties, a further important object of the present invention is to provide for commercially practical methods for reduced fat and low fat microwave popcorn products.

Still another object of the present invention is to provide methods for prepared calcium fortified microwave popcorn products wherein the popcorn is processed at cold temperatures.

Still another object of the present invention is to provide microwave popcorn fat components that are naturally low in trans fatty acids.

It has been surprisingly discovered that the above objectives can be realized and superior microwave popcorn products provided by formulating food charge compositions disposed with microwave popcorn bags, comprising popcorn, optionally salt and low levels of liquid oils having a melting point of about 60° F. or lower.

SUMMARY OF THE INVENTION

Figure 1:
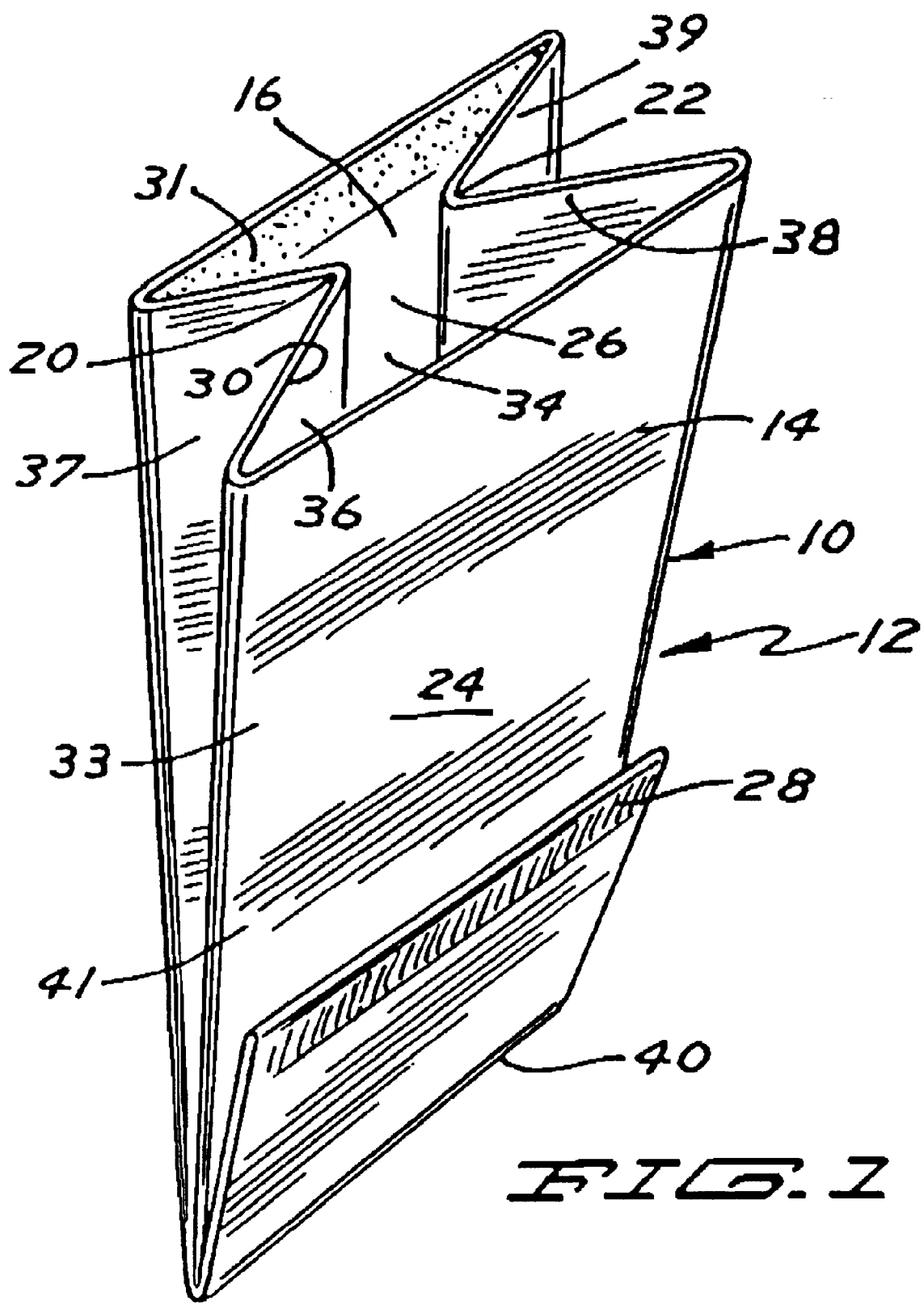
FIG. 1 is a perspective view of an unsealed, folded microwave popcorn bag.

In its article aspect, the present invention relates to improved microwave popcorn articles. The present microwave popcorn articles essentially comprise a microwave popcorn bag and a novel food charge dispersed therein. The food charge essentially comprises kernel popcorn and low levels of liquid oil and can optionally further comprises salt. The kernel popcorn component essentially comprises about 80% to 99% of the charge. The charge further essentially includes about 1 to 20% of liquid oil having a melting point of about 60OF or lower. The food charge can optionally include about 1 to 4% salt.

In its method aspect, the present invention resides in methods for making reduced or low fat a microwave popcorn bag involving filling with cold popcorn kernels, liquid oil having a melting point of about 60° F. or lower, and optionally salt. The salt can be either ultra fine (mean particle size of about 20 μm), coarse salt (mean article size of about 400 μm), or mixtures thereof.

The present methods of microwave popcorn article preparation comprise the steps of:

A. providing a microwave popcorn bag having an open sealable top end defining an upper orifice and a seal area extending over the orifice in an open configuration and in a vertically aligned orientation;

B. filling the bag through the upper orifice defined by the open top end with a quantity of kernel popcorn at least a portion having a temperature of about 60° F. or lower ($\leq 15°$ C.);

C. filling the bag through the upper orifice defined by the open top end with a liquid oil having a melting point of about 60° F. or lower and at a temperature of 120 to 140° F. and 0% to 4%; and, D. sealing the open top end of the popcorn bag after the bag has been filled with the quantity of kernel popcorn, and liquid oil to provide a reduced fat or lowfat microwave popcorn article.

DETAILED DESCRIPTION OF THE INVENTION

The present invention relates to improved reduced fat and lowfat microwave popcorn articles and to their methods of preparation. The present microwave popcorn articles essentially comprise a microwave popcorn bag and a food charge disposed within the bag, said food charge comprising a quantity of 1) kernel popcorn, 2) liquid oil, and optionally 3) salt. Each of these article components as well as methods of filling, product use and attributes are described in detail below.

Throughout the specification and claims, percentages are by weight and temperatures in degrees Fahrenheit unless otherwise indicated.

Microwave Bag

The present microwave popcorn articles essentially comprise a conventional microwave popcorn popping bag. Useful herein for the microwave popping bag are a wide variety of microwave bags available commercially or known in the art. Newly developed microwave popcorn bags or containers are also contemplated for use herein. Useful microwave bags herein can include any conventionally useful bag for microwave popcorn products.

For example, a suitable bag widely used commercially and preferred for use herein is described in U.S. Pat. No. 4,450,180 patent which is incorporated herein by reference. A generally similar bag is described in U.S. Pat. No. 4,548,826. Generally, the bag therein described comprises and is fabricated from a flexible sheet material having two collateral tubular sections. The sections are parallel longitudinally extending that communicate with each other at the center of the package.

Referring now briefly initially to FIG. 1, there is shown an embodiment of a microwave popcorn article 10 composed of a microwave bag 12 formed from flexible sheet material such as paper and being of collateral tubular configuration, that is to say, being composed of a pair of parallel longitudinally extending tubes 14 and 16 which communicate with one another along a central longitudinal opening 18. The two parallel tubes 14 and 16 are separated by longitudinally extending side indentations 20 and 22. When the package comprises a paper bag, the bag can be composed of first and second face panels 24 and 26 respectively and the indentations 20 and 22 comprises gussets. When in a vertically aligned orientation, the bag has a bottom seal 28 and initially an open top or orifice 30 but a sealable seal area 31 that transversely extends the open sealable top. The sealable area can include a heat activated adhesive or a "cold seal" adhesive, as is convenient. After being filled, the top 30 is also sealed conventionally by means of heat or other suitable adhesive to provide a top seal in the top seal area 31.

The bag material is generally fabricated with multiple plies including an outer ply 33 which is generally paper, a grease-proof or resistant inner ply 34 and microwave susceptor film member or ply intermediate these inner and outer paper layers. However, in preferred embodiments the microwave susceptor is present only on one major face panel.

While tubes (or chambers, or channels) 14 and 16 can be of equal size, conventionally the susceptor channel 16 is generally slightly smaller. In such a configuration, the gussets include major left gusset face 36, minor left gusset face 37, major right gusset face 38 and minor right gusset face 39. The bag 12 can be provided with a lower transverse fold 40 to define an intermediate portion or pocket 41.

Although in the present description, a particular description is given to this preferred microwave bag, the present invention is also useful in connection with, for example, flat bottomed bags, bags with or without a bottom fold, with a straight bottom seal or other more complex bottom seal designs. Also, the present methods can be employed using new and improved microwave popcorn bag designs such as those circular microwave popcorn bags described in commonly assigned U.S. Ser. No. 08/945,244 filed Oct. 20, 1997 and/or U.S. Ser. No. 09/090,590 filed May 22, 1998 each by Hunt et al. and each entitled "Easily Expandable Non Trapping Flexible Paper Microwave Package" (each of which incorporated herein by reference).

Popcorn

The present article 10 further essentially includes a food charge disposed within the bag. The food charge essentially includes a quantity of kernel popcorn. Conventionally, microwave popcorn formulations are now expressed based upon the weight of the entire kernel popcorn and fat food charge. This convention is followed in the present description of the invention. Broadly, the popcorn can range from about 80 to 99% of the popcorn charge. Typically, about 15 to 100 g of kernel popcorn is added to the bag, preferably about 70 to 85 g/bag for regular sized products and about 30 to 50 g/bag for "single portion" sized products. In general practice, the amount of kernel popcorn is set and the other ingredients are varied to provide full fat, reduced or low fat, and/or salted or low salt embodiments.

Conventional kernel popcorn varieties can be used herein. Highly preferred for use herein are relatively larger kernel popcorn varieties. Preferred for use herein are those larger varieties having a kernel count of about 40 to 80 kernels per 10 g, preferably 50 to 65, which are commercially available.

Oil

The food charge of the present articles additionally essentially comprise a quantity of an added edible oil that is liquid at room temperature such as having a melting point 60° F. or less.

Generally, the present methods are useful in connection with reduced-fat and with low-fat embodiments. The present invention finds particular suitability for use in connection with snack products that are perceived as being more healthy, such as low fat microwave products. Less preferred but nonetheless useful herein are reduced fat but not full fat products (i.e., having an oil component of more than about 20%).

Low fat products have an even lower fat content than reduced fat embodiments. Reduced fat content products have a fatty triglyceride content of about 10.1% to about 20% supplied herein by the added oil ingredient. All fat percentages are descriptive of added fat and are not meant to include fat or lipid content which may be included in the finished product from other ingredients, e.g., the corn oil native to the kernel popcorn. Thus, broadly, the oil can range from about 1 to 20% and most preferably 10.1 to 14% for reduced fat embodiments. In the low fat embodiments the charge essentially comprises about 1 to about 10% oil, preferably about 1 to 8% and most preferably 3 to 4% oil.

Good results are obtained when the oil used herein has a melting point ranging from about 30 to 60° F., preferably about 30 to 55° F. and for best results about 30 to 50° F. It will be appreciated that oils characterized by a particular melting point, e.g., 50° F., may actually have about 2–3% solids at 50° F. However, these solids are not visible at this temperature. A highly preferred oil herein has a nominal melting point of 50° F. and solid fat index of less than 8% solids at 50° F. and about 2% at 70° F.

The oil can be from any conventional, suitable oil(s) or mixtures thereof from vegetable or animal sources including from butter, canola, corn, cottonseed, peanut, safflower, soybean, sunflower and mixtures thereof. Winterization of the oils is not essential but winterized or dry fractionated partially hydrogenated oils can be used herein. For example, un-hydrogenated genetically modified oils may be used in addition to lightly hydrogenated or partially hydrogenated oils. For best results, the food charge is substantially free (<6%) of any added fat constituent that has a melting point higher than 50° F. The oil is preferably fortified with anti-oxidants, e.g., up to 200 PPM of vitamin E, BHA, BHT and mixtures thereof. If desired, the oils can be lightly or partially hydrogenated to increase stability so long as the degree of hydrogenation does not raise the melting point of partially hydrogenated oil to above 60° F.

The room temperature liquid oils used herein can be supplied by tropical oils such as coconut oil and palm kernel oil, although present consumer health trends disfavor utilization of such oils. Also useful herein are non-absorbable fat mimics such as polyglycerol esters. However, since the oils must be liquid at room temperature (i.e., below body temperature), such materials are much less preferred due to potential gastric problems.

While not wishing to be bound be the proposed theory, it is speculated herein that a liquid oil can be used without a wicking problem in low fat or reduced fat articles due to the small amount of oil relative to the corn and the more concentrated slurry. The corn is able to hold some oil around itself due to surface tension. Also, flowability of the slurry is decreased by the relatively high level of solids, typically about 50% salt, which increases viscosity, but still ensures a desirably pliable bag. This same liquid oil would wick out of higher fat popcorn products unless packaged in a much more expensive type of bag. Also, adequate stability is provided though selection of suitable antioxidants, the use of a high stability liquid oil and partial hydrogenation sufficient to increase stability but still maintaining a liquid consistency at room temperature.

In preferred embodiments the liquid oil is characterized by low levels of trans fatty acids. More particularly, the oil components herein have trans fatty acid levels of less than about 30%.

The liquid oil can include butter flavors and low levels of butter oil, if desired.

Salt

The present microwave popcorn articles can optionally additionally include a salt component. Typically, the salt component is a microsized salt, also known as ultrafine salt or pulverized salt or "flour" salt, typically having a mean particle size of about 22 microns. If employed, this flour salt is simply physically admixed in with the liquid oil to form a oil and salt slurry. Good results, however, are obtained when at least a portion of the salt is a flour form having a mean particle size of less than 30 microns.

In the preferred embodiments, at least a portion of the total salt can be added in the form of a flour sized particulate to the slurry. In those embodiments, it is more preferred that the portion of the total salt added as a salt flour to the slurry be at least 60% of the total salt, even preferably more than 75% of the total salt.

In less preferred variations, a coarse salt ingredient can be employed such as described in co-pending commonly assigned U.S. Ser. No. 08/998,751, filed Dec. 29, 1997 entitled "Microwave Popcorn With Coarse Salt Crystals and Method of Preparation" (attorney docket 5108) which is incorporated herein by reference. Generally, the coarse salt therein described has a larger particle size of about 250 to 600 $\mu$m. Such coarse salt is added to impart an organoleptic attribute in the finished product microwave popcorn to be more reminiscent of the stove-top at-home popped and seasoned popcorn. While in the preferred embodiments herein the salt is in flour form, in other embodiments all or a part of the salt can be in the form of coarse salt added in the third station or in the separate particulates addition step herein.

Optional Ingredients

The present microwave popcorn products can optionally further comprise a calcium ingredient of defined particle size in an amount effective to provide the desired calcium enrichment. Good results are obtained when the present microwave popcorn products contain about 360 to 3600 mg per 100 grams of the food charge. Better results are obtained when the calcium is present at levels of about 360 to 1800 mg per 100 grams. For best results, the total calcium present ranges from about 930 to 1400 mg per 100 grams of the food charge. Excessive calcium fortification is to be avoided in part because the finished product can undesirably exhibit a dry texture, gritty mouth feel, and lower taste perception of flavor and salt.

At a calcium concentration of 360 to 930 mg per 100 grams of the food charge, the finished popped product provides about 10% of the currently recommended daily intake for calcium and thus can be described as "a good source of calcium." The levels in the microwave article suitable for microwave popping account for an estimated 40% loss factor for calcium as the popcorn goes from its unpopped state to the popped state. In addition, these levels also reflect the amount consumed based on the current serving size of 30 grams for popped product as defined by the Food and Drug Administration (FDA).

Useful herein are calcium ingredients that supply at least 20% calcium. For example, a good calcium ingredient herein is calcium carbonate in that calcium carbonate comprises about 40% calcium. While expensive, food grade calcium carbonate obtained by chemical reaction processes is desirable due to low levels of impurities. A good, inexpensive source of calcium carbonate from natural sources is ground limestone. Care should be exercised in selecting sources of ground limestone that are low in trace metals, especially such heavy metals such as lead. In particular, it is desirable that the ground limestone have trace metal concentrations of less than 10 ppm.

Soluble calcium salts typically are expensive and contain low weight percentages of calcium. While calcium chloride is an exception to this generalization, addition of significant calcium levels supplied by calcium chloride impart an unacceptable bitter flavor to microwave popcorn products. In addition, by adding sufficient amounts of many of these calcium salts to achieve the desired fortification level, the finished product may exhibit an undesirably dry texture and gritty mouth feel.

Also useful herein are insoluble mineral calcium salts, particularly calcium phosphate salts provide high levels of calcium and are relatively inexpensive. Moreover, such calcium phosphate salts can be used to provide calcium at high fortification levels with an acceptable taste. Calcium phosphate is generally available as a monobasic ($CaH_4(PO_4)_2 \cdot H_2O$), dibasic ($CaHPO_4 \cdot 2H_2O$) or tribasic ($Ca_3(PO4)_2$) salts. Preferred for use herein is tricalcium phosphate, $Ca_3(PO_4)_2$, ("TCP") because of its high weight percentage of calcium (about 38%). Moreover, TCP is slightly more soluble than other calcium phosphate salts.

A useful tricalcium phosphate starting material is also known as tribasic calcium phosphate or tricalcium orthophosphate and is available in food chemicals codex grade from Monsanto or Rhone Poulenc, having the general formula $3Ca_3(PO_4)2 \cdot Ca(OH)_2$. This product provides an assayed calcium content of from 34 to 40% by weight. Less preferred but nonetheless useful herein is anhydrous dicalcium phosphate, also known as anhydrous dibasic calcium phosphate, having a formula of $CaHPO_4$. An anhydrous dicalcium phosphate material is also available from Stauffer in food chemical codex grade, providing an assay calcium content from about 30 to about 31.7% calcium by weight. Other calcium phosphate hydrates also can be useful, including, but not limited to, calcium pyrophosphate, calcium hexametaphosphate and monobasic calcium phosphate.

Phosphate salts are a preferred source of calcium, not only because of their acid solubility and weight ratios, but also because they are available commercially as a precipitate from whey, a natural dairy product.

The skilled artisan will appreciate that while these calcium phosphate salts are characterized herein as insoluble, of course, some small percentage will dissolve in water depending in part upon the temperature and pH.

Less preferred for use herein but nonetheless useful are other organic calcium salts including calcium ascorbate, calcium citrate, calcium gluconate, calcium lactate, and calcium sulfate. Also useful herein are the calcium citrate malate complexes described in U.S. Pat. No. 5,186,965 entitled "Calcium Citrate Malate Compositions" Feb. 16, 1993) which is incorporated herein by reference. Such organic calcium salts are less preferred primarily based upon cost considerations.

Preferred for use herein are calcium ingredients selected from the group consisting of food grade calcium carbonate, ground limestone, calcium phosphate salts and mixtures thereof.

The calcium ingredient regardless of source or type is further essentially characterized by a particularly fine particle size. Such a fine or flour form of the calcium ingredient provides a particle size such that the average particle size is less than 25 $\mu$m.

Even more preferred for use herein are calcium ingredients having a mean particle of less than 15 $\mu$m and for best results less than 10 $\mu$m. A good material, for example, is a ground limestone of high purity having an average particle size of 3.8 $\mu$m available from Pluess-Stauffer (Calif.), Inc. (Lucerne Valley, Calif.).

While in the preferred embodiment the particulate addition in the third or separate particulate addition step after the slurry has been added) comprises an insoluble calcium phosphate ingredient, the skilled artisan will appreciate that other particulates can be conveniently added in the third filling station or in this step. Such additional particulates can include a wide variety of materials intended to provide various flavor or nutritional advantages. Such materials include sugars, dried dairy ingredients such as dried cheese solids, other minerals, magnesium oxide and mixtures thereof.

However, in more preferred embodiments, the present microwave products are additionally characterized as being sugar free (i.e., by total mono- or disaccharide content of less than 0.5%). Such products exhibit greater shelf stability as well as minimization of sugar related scorching and burning.

In other more preferred embodiments, the present microwave products are additionally characterized as being free of a cheese constituent (i.e., having a cheese ingredient content of less than 0.5%, dry weight basis). Cheese ingredients can also undesirably contribute to scorching and burning problems in microwave popcorn products. It is believed that these problems are due to the protein and sugar (e.g., lactose) constituents thereof. Thus, dried cheeses being generally low in fat and thus high in other constituents are particularly undesirable.

In highly preferred embodiments, the present articles are both sugar(s) free and cheese ingredient free.

Method of Preparation

Figure 2:
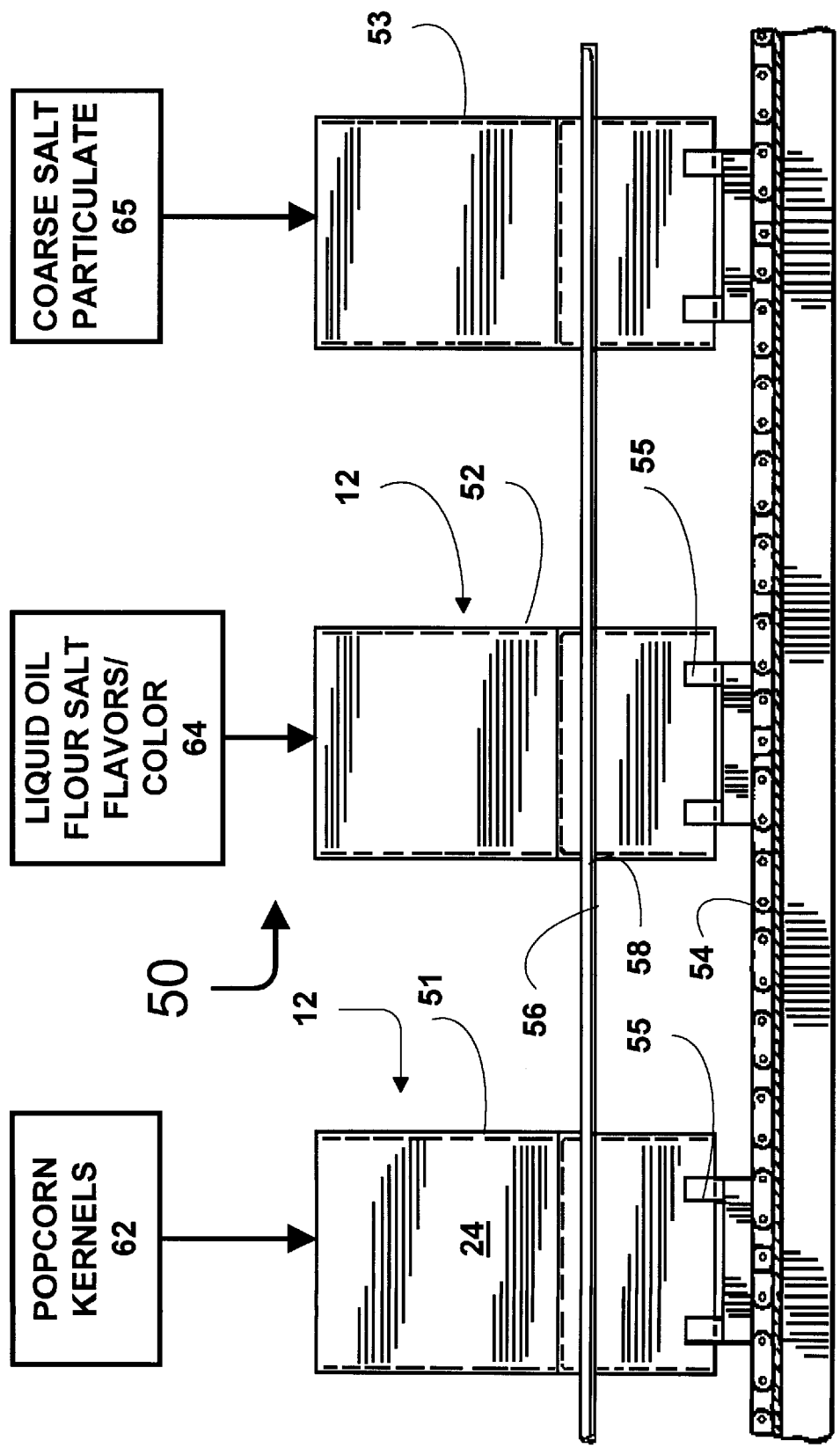
FIG. 2 is a diagrammatic view of one method of filling a microwave popcorn bag in accordance with the invention.

Now referring to FIG. 2, there is seen a schematic of the method of preparation preferred for use herein generally designated by reference numeral 50. The drawing shows a conventional microwave packaging line and depicts three stations thereof designated generally by reference numbers 51, 52 and 53. In upstream stations (not shown) the bag or container is fabricated. For example, the tubular bag material is cut into desired lengths, and is provided with the bottom seal 28. Additionally, in upstream stations (not depicted), the bags 12 are preferably folded to have their bottom third folded up as depicted in first station 51 of FIG. 2 to provide the first lower transverse fold 40 to provide a sealed portion so that the kernel popcorn, oil charge, and salt can be positioned within the bag in the desired middle portion 41 thereof. The bags 12 are advanced from station to station (left to right) by suitable drive means such as the endless drive chain 54 depicted having bag engagement clips 55. Packaging line speeds range from about 50 to 100 bags per minute. Also, the bottom third of the bags are maintained in the closed position by appropriately spaced parallel guide bars 56 and 58. As can be seen, the bag has an open sealable top portion defining an orifice and has a seal area extending across the orifice. The bag at station 51 is provided in an open configuration and in a vertically aligned orientation.

In the present preferred method of filling microwave popcorn bags, the first station 51 is a popcorn filling station. At least a portion of the popcorn has a temperature of less than about 60° F. (15° C.). The present methods find particular suitability for use when the kernel popcorn has a substantial portion (greater than 50%) colder than 50° F. (10° C.) and especially when substantially all the popcorn has a temperature of less than 50° F. or lower, e.g., 32° F. (0° C.).

The liquid oil addition is charged to the bag at a second separate station 52. However, in other variations, the popcorn and oil charging steps can be practiced simultaneously at the same station.

Thereafter, the bags being maintained in the upright, folded orientation depicted in FIG. 2 can optionally then be advanced to the third particulate filling station 53. At the particulate filling station, a quantity of a particulate 65 is then charged to the bag 12 in a separate step.

Once filled with the popcorn, oil slurry and particulate, the bags are then advanced to the sealing station (not shown) wherein the open top end is sealed such as by retractable heat or pressure sealing jaws which impart a seal in the seal area.

The filled and sealed microwave popcorn bags are then advanced to subsequent downstream packaging operations (not shown). Such subsequent downstream packaging operations include folding the bags again to provide a three-folded bag, i.e., to provide a second upper transverse fold; overwrapping the folded bags with an overwrap or moisture barrier layer; and inserting desired numbers of the packaged article into cartons.

Now that the present methods have been described in general terms, in particular, at the filling station 51 the process involves the step 62 of filling the bag through the upper orifice with a quantity of popcorn kernels. Generally, however, the process step can conveniently be practiced at filling station 51 by employing a means for dispensing a measured quantity of kernel popcorn such as a dispensing wheel. The dispensing wheel discharges at timed intervals a measured quantity (e.g., 80 to 90 g) of the kernel popcorn into a vertically oriented filling horn or funnel. The funnel causes the kernel popcorn to fall by gravity into the bag 12. The kernel popcorn has a temperature of about 60° F. (15° C.) or lower due to wintertime unheated storage. It will be appreciated that the kernel popcorn can have a much lower temperature i.e. −30° F., depending upon storage temperatures in winter.

While the present invention finds particular suitability for use with cold kernel popcorn, (i.e., $\leq 60°$ F.), the skilled artisan will appreciate that the present invention can also be used with warm kernel popcorn, i.e., with kernel popcorn having a temperature of greater than 60° F.

At the second or oil slurry filling station 52, the present methods additionally include the step 64 of filling the bag 12 through the upper orifice with a quantity of liquid oil (with or without butter oil). The liquid oil is characterized by a melting point value of about 60° F. (15° C.) or lower. The liquid oil is supplied from an oil supply or reservoir at a temperature of 120 to 140° F.

The term slurry is used herein as is common in the microwave popcorn art to refer to any coating applied to the kernel popcorn. The term "slurry" as used generally herein thus includes oil alone; oil and a lesser portion of salt in flour form; oil, flour salt, flavors and/or color or sweetener(s); as well as any other variation or combination of ingredients used as an addition to the kernel popcorn herein.

The slurry can additionally optionally comprise minor amounts of other materials employed to make the microwave popcorn more aesthetically or nutritionally or organoleptically appealing. Such adjuvant ingredients can include, for example, sugar(s), minerals, vitamins, colorants, preservatives and flavors. If present, each of these constituents can comprise from about 0.01 to about 2% by weight of the fat slurry.

Especially popular for use herein is a butter flavor. The flavors can be either in liquid, fat soluble forms and/or in dry powder forms such as a liquid oil absorbed onto a particulate carrier, e.g., gum arabic, starch, silicon dioxide, or dehydrated cheese solids. Also useful as a flavoring additive is butter oil.

The oil slurry is prepared simply by admixing the oil together with any optional ingredients with salt and blending the mixture to form a stable dispersion or slurry. The oil or slurry, is then sprayed into the microwave popcorn bag or onto the falling popcorn cascade as described in detail below.

The slurry application step can be practiced by employing an applicator for spraying the oil slurry (e.g., commercially available from Hibar Systems Limited, Ontario, Canada) that is supplied by a slurry supply means (not shown). The slurry supply means can conveniently include a conventional positive displacement reciprocating metering pump having a piston and a pressurized slurry inlet. The pump precisely pumps metered amounts of the fat slurry to the applicator at closely controllable time intervals.

If the slurry viscosity is too high, then the slurry becomes unpumpable. The concentrations of salt oil and other ingredients are selected such that the slurry has a viscosity of less than 10,000 cps, preferably less than about 4,000 cps, and, for best results, less than 1,000 cps.

The slurry can be added at temperatures ranging from about 15° to 65° C. (60° to 15° F.), preferably about 50° to 60° C. (120 to 140° F.)

While a pencil jet spray is preferred for use herein, equivalents thereof in terms of dispensing the slurry can also be used. For example, a multiplicity of very fine jet streams, (e.g., 3–12), or a sparge can be used to achieve the desired dispersion hereunder. Also, other spray types (e.g., a cone spray, a mist spray, or a fan spray) are useful herein. However, great care must be taken in selecting such useful alternatives so as to avoid getting slurry in the bag seal area. In other embodiments, the spray can be gas assisted, e.g., air, steam, or inert gas.

In preferred embodiments, the bag 12 has a microwave chamber (i.e., wherein one major face panel has an intermediate microwave susceptor layer between the inner and outer bag layers) and, for cost considerations, a microwave susceptor-free chamber. In the preferred practice, the kernel popcorn, fat slurry and particulate(s) are charged to the microwave channel. Conventionally, the microwave channel is the lesser channel (i.e., being formed by the smaller major face 24) and the greater channel is the microwave free channel. Such a configuration minimizes the amount of relatively expensive microwave susceptor material required while nonetheless providing the needed expansion volume upon microwave popping.

In the preferred form, the popcorn charging and slurry addition are practiced at separate stations and as separate steps. However, in other embodiments, the kernel popcorn and slurry addition can be practiced in a single station concurrently. Apparatus and techniques for such concurrent filling of the popcorn and slurry are described in commonly assigned U.S. Pat. No. 5,690,979 (issued Nov. 25, 1997) entitled "Method of Preparing Reduced Fat Microwave Popcorn."

At station 53, it can be seen that the present methods can optionally additionally comprise the step 66 of filling the bag with a quantity of a particulate after the bag is filled with popcorn and fat. Generally, however, the particulate filling station 53 (e.g., course size salt) includes a means for dispensing a measured quantity of salt, calcium ingredient (s), other particulates and mixtures thereof.

The present methods further essentially include a conventional finish step (not shown in FIG. 2) of sealing the open end of the microwave popcorn bag after the bag has been filled with the quantity of popcorn kernels, the oil slurry and the quantity of particulates.

By virtue of having been prepared using a liquid oil, upon further handling the filled bag articles are much less likely to disrupt the manufacturing process.

Product Use

The reduced fat and lowfat microwave popcorn products prepared as described can be used in a conventional manner for the at-home preparation of popcorn by microwave heating. Upon microwave heating of the sealed microwave popcorn article in a conventional home microwave oven, the resultant popped popcorn in the form of free flowing of individual substantially unagglomerated popped popcorn kernels exhibits excellent organoleptic attributes.

Industrial Applicability

The present invention finds suitability for use in the provision of a mass market, shelf stable consumer food item adapted to prepare reduced fat or lowfat oiled, flavored popcorn upon microwave.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of the microwave popcorn art, can be undertaken without departing from the spirit and scope of the invention.

EXAMPLE 1

An improved microwave popcorn article of the present invention comprising a microwave popcorn bag is prepared having the popcorn/oil charge of the composition indicated below. The microwave popcorn bag is fabricated substantially in accordance with the teachings of U.S Pat. No. 4,450,180. Microwave popcorn articles comprising microwave popcorn bags of this type are available under the brand name Betty Crocker™/Pop Secret™. The popcorn food charge has the following composition:

| Ingredients | Weight % |
| --- | --- |
| Popcorn | 94.4 |
| Oil | 2.4 |
| Salt | 2.7 |
| Artificial butter flavor | 0.5 |
| | 100.0 |

1. A non hydrogenated soybean oil available from Cargill Foods under the trade name "Hi-Stability Liquid Shortening".

The oil melting point is about 50° F.

A supply of the oil, butter, salt and is prepared to form a warm slurry (about 122° F.; 50° C.). The slurry has a viscosity of 3500 cps.

The fat slurry comprises:

| | |
| --- | --- |
| Soybean Oil | 38.9% |
| Salt | 49.9% |
| Artificial Butter flavor | 6.8% |
| High Fat Butter | 4.4% |

The salt added to the slurry was a flour salt having a mean particle size of about 22 μm.

A quantity of microwave popcorn bags were filled as follows:

About 82 g of popcorn was dispensed by the dispensing wheel into the funnel.

The popcorn filled bag was then advanced to a second filling station. An oil slurry applicator was timed to dispense about 4.8 g of the slurry in the form of a downwardly projecting vertically aligned pencil jet spray. The duration of the spray was about 0.5 seconds. The slurry charged the oil slurry within the microwave popcorn bag below the seal area.

The bags were then heat sealed to form finished reduced fat microwave popcorn articles of the present invention. The articles can be further provided with a conventional moisture resistant overwrap (e.g., fabricated from polypropylene material).

What is claimed is:

1. A method for preparing a reduced or low fat microwave popcorn article by filling with a food charge comprising kernel popcorn, oil and salt, comprising the steps of:
   A. providing a microwave popcorn bag or container having a sealed portion and an open sealable top portion in an open configuration defining an upper orifice;
   B. filling the bag or container through the upper orifice with a quantity of popcorn kernels at least a portion of which having a temperature of about 60° F. or less in amounts sufficient to provide the food charge with about 80% to 99% kernel popcorn;
   C. filling the bag through the upper orifice with a quantity of a liquid oil having a melting point of 60° F. in amounts sufficient to provide the food charge with about 1% to 20% oil and with a quantity of salt in amounts sufficient to provide the food charge with about 0% to 4% salt; and
   D. sealing the open top end of the popcorn bag after the bag has been filled with the quantity of popcorn kernels, the oil, and the quantity of salt.

2. The method of claim 1 wherein the oil and salt are applied as a slurry.

3. The method of claim 2 wherein the step C of filling the bag with the quantity of popcorn kernels and the fat slurry comprises the substeps of:
   A. dispensing the quantity of popcorn kernels in an airborne stream; and concurrently,
   B. spraying a quantity of the oil slurry into the airborne popcorn stream to coat the popcorn with the slurry.

4. The method of claim 2 wherein the step of filling the bag with the quantity of popcorn kernels and the oil slurry comprises the substeps of:
   A. dispensing the quantity of popcorn kernels through the upper orifice; and, thereafter
   B. spraying a quantity of oil slurry through the upper orifice defined by the open top end.

5. The method of claim 4 wherein in step B the oil comprises about 1% to 10% of the food charge.

6. The method of claim 4 wherein the food charge is substantially free of an oil having a melting point of greater than 60° F.

7. The method of claim 5 wherein at least a portion of the salt is in flour form having a particle size of less than 90 microns.

8. The method of claim 6 wherein the food charge comprises about 88% to 98% popcorn, about 1% to 8% oil and about 1% to 4% salt, and sufficient amounts of the calcium ingredient to provide the food charge with a total calcium content of about 360 to 3600 grams per 100 grams of unpopped popcorn and having a particle size of less than 25 microns.

9. The method of claim 8 wherein the oil has a melting point of about 60° F. of less.

10. The method of claim 9 wherein at least a portion of the oil is supplied by a butter oil.

11. The method of claim 6 wherein the oil includes about 200 ppm of antioxidant.

12. The method of claim 6 wherein the oil has a trans fatty acid content of less than 30%.

13. The method of claim 11 wherein the food charge is free of a cheese ingredient.

14. The method of claim 13 wherein the oil or slurry has a spray temperature of between about 120° to 130° F. (50° to 55° C.).

15. The method of claim 14 wherein the food charge is free of added sugar(s).

16. The method of claim 6 wherein the food charge contains sufficient amounts of the calcium ingredient to provide about 360 to 1800 mg per 100 grams of unpopped popcorn.

17. The method of claim 14 wherein in step B at least 50% of the kernel popcorn has a temperature of less than about 50° F.

18. The method of claim 17 wherein in step B substantially all of the kernel popcorn has a temperature of less than about 50° F.

19. The method of claim 15 wherein the popcorn quantity ranges from about 90% to 95% and the oil quantity ranges from about 3% to 4%.

20. The product prepared by the process of claim 1.
21. The product prepared by the process of claim 2.
22. The product prepared by the process of claim 3.
23. The product prepared by the process of claim 5.
24. The product prepared by the process of claim 8.
25. The product prepared by the process of claim 10.
26. The product prepared by the process of claim 12.
27. The product prepared by the process of claim 17.
28. The product prepared by the process of claim 18.
29. The product prepared by the process of claim 19.

30. A microwave popcorn article exhibiting desirable organoleptic attributes comprising:
   a continuously sealed microwave popcorn bag, and
   a food charge disposed therein of popcorn and oil uniformly dispersed upon the popcorn, said charge comprising:
   A. about 80% to 99% of the product of unpopped popcorn kernels,
   B. about 1% to 20% of the product of an edible oil having a melting point of about 60° F. or less uniformly dispersed upon the popcorn kernels,
   C. about 0% to 4% of the product of salt.

31. The article of claim 30 wherein the oil is fortified with up to 200 ppm of antioxidants.

32. The article of claim 31 wherein the oil comprises about 1% to 10% of the food charge.

33. The article of claim 32 wherein the oil comprises about 10.1% to about 20% of the food charge.

34. The article of claim 33 wherein at least a portion of oil is supplied by a butter oil.

35. The article of claim 30 wherein the food charge comprises about 1% to 4% salt.

36. The article of claim 35 wherein at least 60% of the salt is supplied by a flour salt having an average particle size of less than 50 microns.

37. The article of claim 36 additionally comprising sufficient amounts of a calcium ingredient to provide the food charge with a total calcium content of about 360 to 3600 grams per 100 grams of unpopped popcorn and having a particle size of less than 25 microns.

38. The article of claim 37 wherein at least a portion of the calcium ingredient or ground limestone.

39. The article of claim 30 wherein at the food charge is free of a cheese ingredient and free of a sugar ingredient.

40. The article of claim 30 having about 70 to 85 g popcorn.

41. The article of claim 36 wherein the liquid oil has a melting point of between about 30° F. and 60° F. (−1° C. to 15.5° C.).

42. The article of claim 36 wherein the liquid oil has a melting point of less than about 50° F. (10° C.).

43. The article of claim 41 wherein the liquid oil has a melting point of less than about 50° F. (10° C.).

44. The article of claim 30 wherein the liquid oil has a trans fatty acid content of less than about 30%.

45. The article of claim 43 wherein at least a portion of the salt is in flour form having a mean particle size of about 25 microns or less.

46. The article of claim 43 wherein at least a portion of the salt is in coarse or granular form having particle size of about 250 to 600 microns.

47. The article of claim 37 comprising sufficient amounts of a calcium ingredient to provide the food charge with a total calcium content of about 930 to 1,400 mg. per 100 g. of the food charge.

48. The article of claim 47 wherein at least a portion of the calcium ingredient is tricalcium phosphate.

49. The article of claim 30 wherein the liquid oil has a trans fatty acid content of less than about 30%.

50. In a microwave popcorn article comprising a sealed microwave popcorn bag and a food charge disposed within the bag comprising popcorn, oil and 0% to 4% salt, the improvement comprising: wherein the food charge includes about 1% to 20% of edible oil having a melting point of substantially less than about 60° F. (15.5° C.) and is substantially free of an oil having a melting point of greater than 50° F.

51. The microwave popcorn article of claim 50 wherein oil is fortified with up to 200 ppm antioxidant.

52. The microwave popcorn article of claim 51 wherein the oil comprises about 1% to 10% of the food.

53. The microwave popcorn article of claim 52 additionally comprising a moisture barrier overlap.

54. The microwave popcorn article of claim 53 wherein at least a portion of the oil is supplied by a partially hydrogenated soybean oil.

55. The article of claim 50 wherein the oil comprises about 10.1% to about 20% of the food charge.

56. The article of claim 55 wherein at least a portion of oil is supplied by a butter oil.

57. The article of claim 52 wherein the food charge comprises about 1% to 4% salt.

58. The article of claim 57 wherein at least 60% of the salt is supplied by a flour salt having an average particle size of less than 25 microns.

59. The article of claim 58 additionally comprising sufficient amounts of a calcium ingredient to provide the food charge with a total calcium content of about 360 to 3600 grams per 100 grams of unpopped popcorn and having a particle size of less than 25 microns.

60. The article of claim 59 wherein at least a portion of the calcium ingredient or ground limestone.

61. The article of claim 50 wherein at the food charge is free of a cheese ingredient and free of a sugar ingredient.

62. The article of claim 50 having about 70 to 85 g popcorn.

63. The article of claim 50 wherein the liquid oil has a melting point of between about 30° F. and 60° F. (−10° C. to 15.5° C.).

64. The article of claim 63 wherein the liquid oil has a melting point of less than about 50° F. (10° C.).

65. The article of claim 55 wherein the liquid oil has a melting point of less than about 50° F. (10° C.).

66. The article of claim 50 wherein the liquid oil has a trans fatty acid content of less than about 30%.

67. The article of claim 65 wherein at least a portion of the salt is in flour form having a mean particle size of about 25 microns or less.

68. The article of claim 50 wherein at least a portion of the salt is in coarse or granular form having particle size of about 250 to 600 microns.

69. The article of claim 59 comprising sufficient amounts of a calcium ingredient to provide the food charge with a total calcium content of about 930 to 1,400 mg. per 100 g. of the food charge.

70. The article of claim 69 wherein at least a portion of the calcium ingredient is tricalcium phosphate.

71. The article of claim 52 wherein the liquid oil has a trans fatty acid content of less than about 30%.

* * * * *